W. E. PORTER.
REMOVABLE SELF HOLDING WASHER FOR CLOCK MOVEMENTS.
APPLICATION FILED SEPT. 6, 1919.
Patented Aug. 3, 1920.
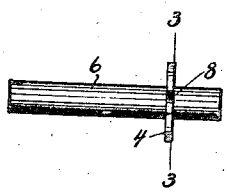
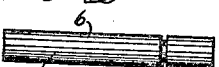
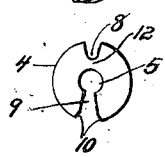 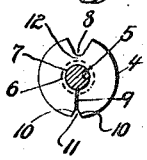

UNITED STATES PATENT OFFICE.

WILSON E. PORTER, OF NEW HAVEN, CONNECTICUT, ASSIGNOR TO NEW HAVEN CLOCK CO., OF NEW HAVEN, CONNECTICUT, A CORPORATION.

REMOVABLE SELF-HOLDING WASHER FOR CLOCK-MOVEMENTS.

1,348,517. Specification of Letters Patent. Patented Aug. 3, 1920.

Application filed September 6, 1919. Serial No. 322,021.

*To all whom it may concern:*

Be it known that I, WILSON E. PORTER, a citizen of the United States, residing at New Haven, in the county of New Haven and State of Connecticut, have invented a new and useful Improvement in Removable Self-Holding Washers for Clock-Movements; and I do hereby declare the following, when taken in connection with the accompanying drawings and the characters of reference marked thereon, to be a full, clear, and exact description of the same, and which said drawings constitute part of this application, and represent, in—

Figure 1 a view in elevation showing my invention applied to the dial-pinion stud of a clock-movement.

Fig. 2 a detached plan view of the stud.

Fig. 3 a sectional view on the line 3—3 of Fig. 1, showing the washer as closed upon the stud.

Fig. 4 a detached view of the washer prior to being closed upon the stud.

My invention relates to an improved removable self-holding washer for use in clock-movements and in kindred situations wherever available, the object being to produce a cheap, convenient, and effective self-holding washer constructed with particular reference to ease of application and removal without mutilation.

With these ends in view, my invention consists in a removable self-holding washer having a central opening, a weakening-notch in its edge, and a radial opening-and-closing slot entering the said opening from the edge of the washer.

In carrying out my invention as herein shown, I employ a washer 4 having a circular central opening 5 a trifle larger than the diameter of the dial-pinion stud 6 which is formed with a peripheral groove 7 into which the edges of the opening 5 are closed when the washer is applied. The said washer is formed in its outer edge with a weakening-notch 8 which does not intersect the said opening, and with a radial opening-and-closing slot 9 intersecting its outer edge and also intersecting the said opening and preferably located opposite the weakening-notch and also preferably having the outer ends of its side walls beveled as at 10 for the production, when the washer is applied, of a V-shaped instrument-notch 11 for the reception of the edge of an instrument for spreading the washer open sufficiently to permit its removal from the stud, or whatever else it may be mounted upon.

In the use of my improved washer, it is slid over the stud 6 into alinement with the groove 7 therein, and then closed by means of ordinary pliers until the edges of its slot 9 are brought into contact as shown in Fig. 3, whereby the edges of its opening 5 are closed into the groove 7, thus securely fastening the washer upon the stud against endwise movement thereupon. When the washer is so closed, its weakening-notch 8 is opened, as shown in Fig. 3, the two halves of the washer being turned, as it were, upon the metal about the point 12 between the bottom of the weakening-notch 8 and the adjacent edge of the opening 5. The closing of the washer upon itself as described, brings the bevels 10 of the outer edges of its slot 9 together to form the V-shaped instrument-notch 11 into which an instrument may be inserted for prying the washer open for its removal from the stud. When the washer is so pried open it will return to its original form in which it is shown in Fig. 1 by the turning of its two halves upon the metal at the point 12. In practice it will be found convenient to open the washer by means of ordinary cutting pliers, one jaw entering the notch 8 and the other jaw entering the notch 11. My improved washer will be found to be a source of especial convenience to the clock-repairer, since he may with any convenient tool, such as a pair of ordinary cutting pliers, remove the washer without mutilating it, leaving it in condition to be used again. As applied to the dial-pinion stud of a clock-movement, the washer holds the dial-pinion and the dial-wheel carried thereby in place upon the stud. Although I have shown my improved washer as applied to such a stud, it is obviously available for use in any situation where removable washers are called for.

I claim:—

In a clock-movement, the combination with a stud having a peripheral groove, of a removable self-holding washer having a central opening large enough to permit it to be passed over the said stud and registered with the said groove, and the said washer having a weakening-notch in its outer edge and a radial opening-and-closing notch intersecting its outer edge and the said opening, whereby the said washer may be closed for the entrance of the edges of its said opening into the said groove.

In testimony whereof, I have signed this specification in the presence of two subscribing witnesses.

WILSON E. PORTER.

Witnesses:
 FREDERIC C. EARLE,
 GEORGE D. SEYMOUR.